(12) United States Patent
Kohl

(10) Patent No.: US 8,142,654 B2
(45) Date of Patent: Mar. 27, 2012

(54) WATER BOTTLE WITH FILTER

(76) Inventor: Abraham K. Kohl, Parkland, FL (US)

(*) Notice: Subject to any disclaimer, the term of this patent is extended or adjusted under 35 U.S.C. 154(b) by 280 days.

(21) Appl. No.: 12/586,605

(22) Filed: Sep. 24, 2009

(65) Prior Publication Data

US 2010/0170839 A1    Jul. 8, 2010

Related U.S. Application Data

(60) Provisional application No. 61/204,605, filed on Jan. 7, 2009.

(51) Int. Cl.
*B01D 24/12* (2006.01)
*B01D 35/027* (2006.01)

(52) U.S. Cl. ........ 210/244; 210/282; 210/291; 210/317; 210/484; 210/502.1

(58) Field of Classification Search .................. 210/244, 210/245, 282, 289, 291, 317, 474, 476, 482, 210/484, 502.1, 246; 222/189.06, 189.09, 222/189.04

See application file for complete search history.

(56) References Cited

U.S. PATENT DOCUMENTS

| | | | | | |
|---|---|---|---|---|---|
| 2,630,227 | A | * | 3/1953 | Rodwell | 210/265 |
| 4,151,254 | A | * | 4/1979 | Gimovsky | 422/71 |
| 4,389,311 | A | * | 6/1983 | La Freniere | 210/198.1 |
| 4,529,511 | A | * | 7/1985 | Breeden et al. | 210/94 |
| 6,004,460 | A | * | 12/1999 | Palmer et al. | 210/232 |

* cited by examiner

*Primary Examiner* — Matthew Savage
(74) *Attorney, Agent, or Firm* — Robert M. Downey, P.A.

(57) ABSTRACT

A disposable and recyclable water bottle formed of a non-toxic plastic composition includes a flexible sidewall, a neck with an open top and cap, and an open bottom end. A filter cartridge is received within the open bottom and contains activated carbon sandwiched between 0.7 to 50 microns filtration membranes, all contained between upper and lower perforated plates. A lower portion of the filtration cartridge provides a filling chamber for receiving a flow of unfiltered water on to the lower perforated plates for passage through the filter. An arrangement of slots in the walls of the filling chamber allows a portion of the flowing water to bypass the filter in order to prevent overflow when filling the bottle. A cap containing internal screw threads attaches to the external screw threads of the open bottom end, sealing the interior of the bottle. Once sealed, the contained water is allowed to move around in a fluid motion between the interior of the bottle and the filling chamber.

16 Claims, 11 Drawing Sheets

WATER BOTTLE WITH FILTER

This application is based on provisional patent application Ser. No. 61/204,605 filed on Jan. 7, 2009.

BACKGROUND OF THE INVENTION

1. Field of the Invention

The present invention relates to a portable drinking water container with a filtration device and, more particularly, to a plastic bottle that can be filled from municipal water sources through a filter located at the bottom, thereby filtering the water prior to entry into the container.

2. Discussion of the Related Art

Today the world population has minimal faith in the purity of domestic potable water supplies available from a faucet or drinking fountain. This is demonstrated by the explosion of the bottled water industry. In the United States alone, sales of single use water bottles have exceeded 15 billion dollars per year. The use of aforementioned single use bottle water containers is extremely costly, amounting to as much as $10 per gallon of water compared to about 1 cent per gallon of municipal water. Moreover, single use plastic water bottles present a significant environmental concern with only 10% of single use water bottles being recycled. The lack of recycling accounts for over 60 million bottles being deposited in our landfills every day. New York State department of Environmental Conservation reports that, in 2005, manufacturing of these plastic bottles released more than 800,000 metric tons of greenhouse gasses into our atmosphere. And, the oil used to make the bottles sold in the state of New York during 2005 would provide enough gasoline for 120,000 cars to run for an entire year. Finally, most single use bottles are made out of PET (polyethylene Terephthalate) which presents a serious health concern due to the potential leaching of antimony trioxide into the water that is subsequently consumed from the plastic bottles.

OBJECTS AND ADVANTAGES OF THE INVENTION

Considering the foregoing, it is a primary object of the present invention to provide a reusable and disposable plastic water bottle that is easy to fill with municipal water, and wherein a portion of the municipal water is filtered upon entry to the bottle through a filter cartridge at the bottom of the bottle, and furthermore wherein all of the municipal water is eventually filtered through the same filter cartridge while the bottle is carried around.

It is a further object of the present invention to provide a reusable and disposable water bottle that allows for filtering of municipal water upon filling and throughout use, and wherein the water bottle is made of a non-toxic plastic composition such as High Density Polyethylene (HDP), Low Density Polyethylene (LDP), or Polypropylene (PP) to prevent leaching of toxic plastic byproducts into the water contained in the bottle, and thereby avoiding hazardous consumption of plastic toxins.

It is a further object of the present invention to provide a reusable and disposable water bottle that allows the user to quickly fill the bottle with municipal water by allowing a large portion of the water to be filtered after filling.

It is yet a further object of the present invention to provide a reusable water bottle that allows the user to quickly fill the bottle with municipal water or water from another source and to filter at least a portion of the water upon filling the bottle and wherein the bottle is further structured and disposed to continue filtering the water contained in the bottle as the bottle is carried and moved.

It is still a further object of the present invention to provide a reusable and disposable water bottle that substantially reduces the number of plastic bottles entering landfills.

It is still a further object of the present invention to provide a reusable and disposable water bottle that substantially reduces the cost of water to the end consumer, reducing the cost by as much as 10 dollars per gallon.

It is still a further object of the present invention to provide a reusable and disposable water bottle that substantially reduces the number of water bottle manufactured per year, thereby reducing the amount of petroleum used as well as the amount of greenhouse gases released into the atmosphere as a result of the manufacture of plastic bottles.

It is still a further object of the present invention to provide a reusable and disposable water bottle with a bottom filter cartridge having a useful life of 40-60 gallons or two months use.

It is still a further object of the present invention to provide a reusable and disposable water bottle that will replace 240 single use plastic bottles normally disposed of by an average consumer.

These and other objects and advantages of the present invention are more readily apparent with reference to the detailed description and accompanying drawings.

SUMMARY OF THE INVENTION

The current invention will use either High Density Polyethylene (HDPE), Low Density Polyethylene (LDPE) or Polypropylene (PP) in its construction, thereby eliminating the current health risks associated with PET. The sealing bottom cap is removable to expose the filtration cartridge. The filter cartridge comprises a lower compartment which acts as a filling chamber and an upper compartment which acts as a filtration membrane. The filter cartridge provides membrane filtration of between 0.7 to 50.0 microns combined with the use of activated carbon or silver impregnated activated carbon to reduce most offensive contaminants (e.g. chlorine, and heavy metals) found in today's water supply. The unique design of this filter cartridge improves the color, taste and odor of water taken from municipal water sources while reducing chlorine and other harmful chemicals. The filling chamber which is directly exposed to the exterior of the bottle provides a space for water to fill while it slowly passes through the filtration membrane. Several slots built into the side wall of the filling chamber allow a portion of the filling water to bypass the filter and go directly into the interior of the bottle should the rate of flow of water from a municipal source exceed the filtration rate of the cartridge. Water which is filtered reaches the interior of the bottle once it has passed through the filtration media and membranes. Once the sealing bottom cap is resealed, water throughout the interior of the bottle will make its way back through the filling chamber slots and then through the filtration media. In this way, almost all if not all of the water in the bottle eventually gets filtered without requiring a long filling time. The current invention will allow the user to drink the filtered water freely from the top of the bottle, either through a removable cap or nozzle and valve design, without having to suck the water through a straw or a filter located in close proximity to their mouth.

The bottle design of the present invention can also be adapted to a sports bottle of the type used in hockey, football, soccer, track and field, tennis, basketball etc. Currently, the water used to fill sports bottles and replenish athletic participants is taken straight from municipal sources, such as a bathroom sink, a kitchen faucet or even a garden hose, with no regard to filtration. These bottles are commonly shared among multiple participants (i.e. teammates). The bottle of the present invention will incorporate a nozzle and valve design to avoid the need of participants' mouths from being in close proximity to the bottle while drinking the filtered water that exits the top nozzle. Because the water in the sports bottle of this invention is filtered either at filling or while being carried, as opposed to upon exiting, it is not difficult for a player to receive water from the bottle when squeezed. With minimal force, the previously filtered water exits the top nozzle in a stream which can travel a considerable distance, without the resistance of a filter.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
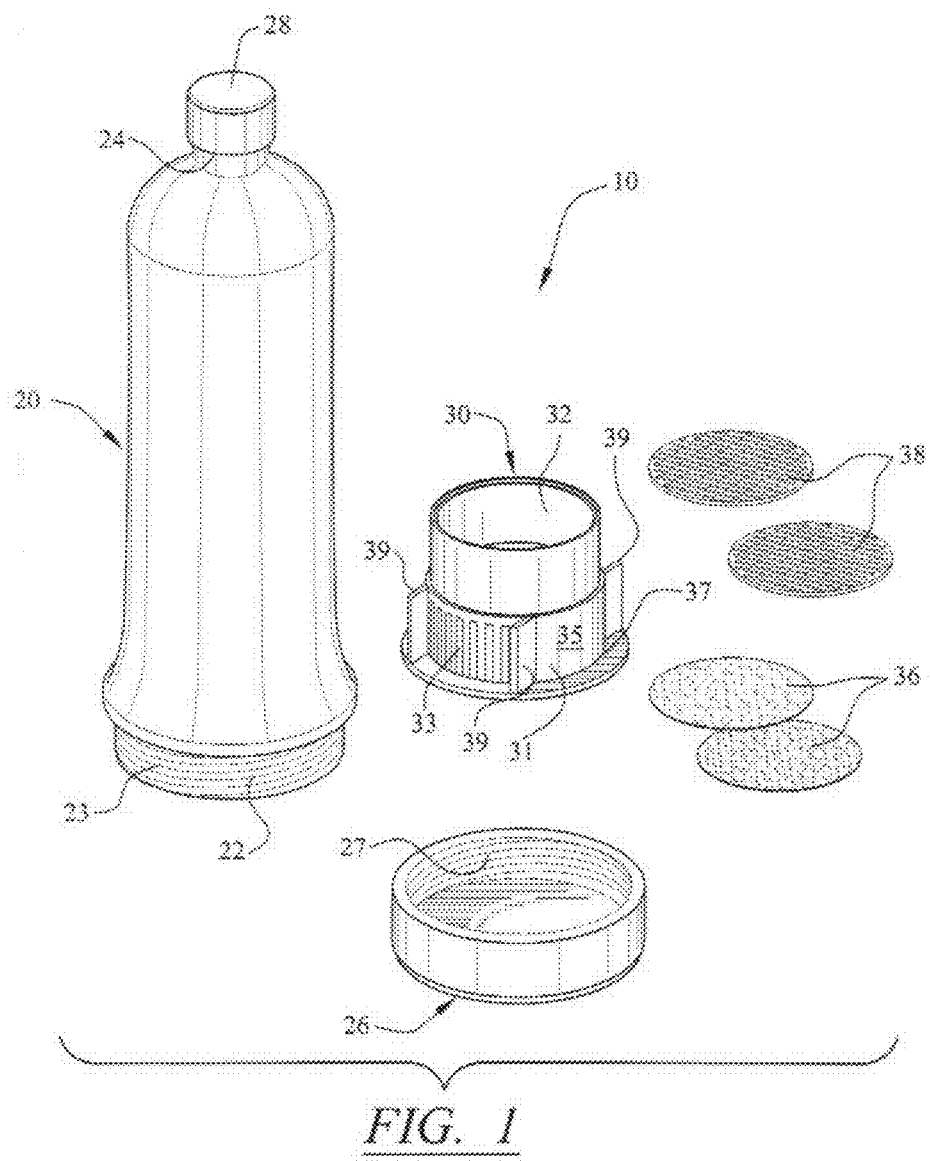
FIG. 1 is an exploded perspective view of the components of the water bottle and filter assembly of the present invention in accordance with a first preferred embodiment thereof.

Referring to FIGS. 1-4, the reusable and disposable water bottle and filtration assembly of the invention is shown and is generally indicated as 10. It is preferred that molded components of the assembly 10 be constructed of Low Density Polyethylene (LDP), High Density Polyethylene (HDP), or Polypropylene (PP), thereby eliminating the possible leaching of toxic plastic byproducts into the water and subsequently the human body.

The assembly 10 includes a bottle 20 with a bottom opening 22 and a top opening (not shown) surrounded by a top neck 24. The bottom opening 22 is normally covered and sealed closed with bottom cap 26 by properly aligning exterior threads 23 on the bottom of the bottle with interior threads 27 on the inside of the cap 26. The top opening is sealed with top cap 28 in a similar fashion. The bottle 10 is the same for each of the several embodiments of the invention shown in FIGS. 1-13 and described hereinafter.

A filtration cartridge 30 is inserted into the bottle through the bottom opening 22. The filtration cartridge 30 comprises an upper compartment 32 fitted with a filtration assembly which filters water that passes through the upper compartment 32. The filtration assembly includes a carbon based media 34, two sheets of filtration membranes 36 which have a pore size of between 0.7 and 50 microns, and rigid or semi-rigid covers (e.g., disks) 38 that have an arrangement of small holes or openings formed therethrough. In a preferred embodiment, the covers 38 are bonded to the cartridge 30 by heat welding or sonic welding. The filtration cartridge 30 further comprises a lower compartment 31 which acts as a filling chamber for water entering the device 10. An arrangement of slots 33 are formed through the side wall 35 that surrounds the lower compartment 31. The filtration cartridge 30 further comprises an annular flange 37 located at the bottom of the lower compartment 31 to prevent the filtration cartridge 30 from falling into the interior 21 of the bottle 20. Stabilizing fins 39 keep the filtration cartridge 30 in place and prevent it from tilting or wobbling when the bottle is moved. The filtration cartridge 30 is held in place and prevented from falling out of bottle 20 by the sealing bottom cap 26.

Figure 2:
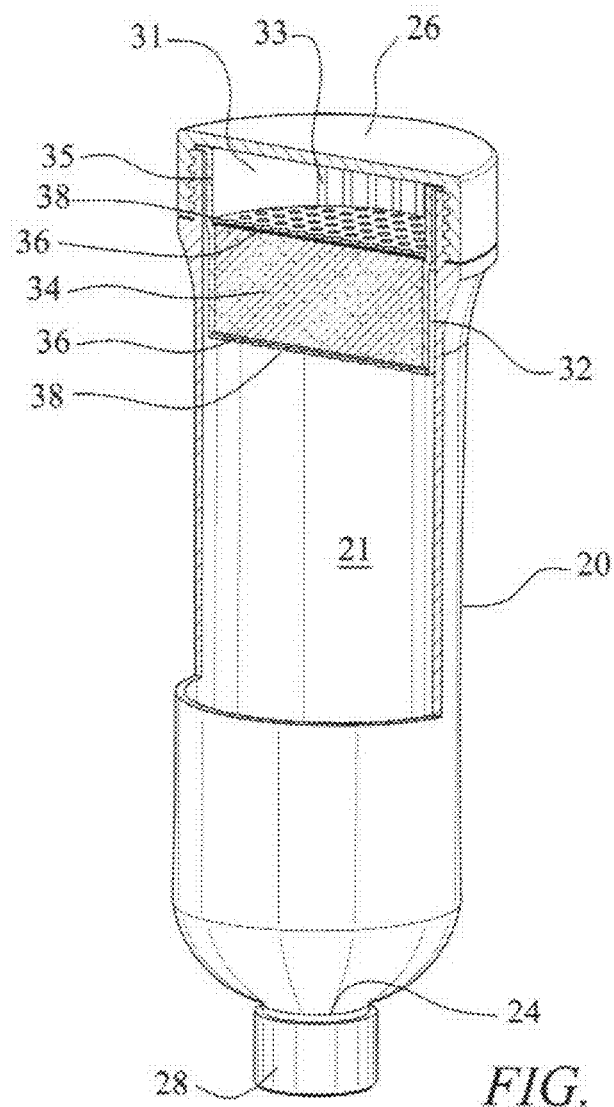
FIG. 2 is a cross sectional view of the first embodiment of the water bottle while it is sealed and empty.

Referring to FIG. 2, the operable position of filter cartridge 30 inside bottle 20 can be seen. Sandwiched between the membrane filters 36 is activated carbon 34. The type of Carbon media used may include Silver impregnated activated carbon, Coconut Activated Carbon, Coal Activated Carbon, Lignite Activated Carbon or Wood Activated Carbon.

Figure 3:
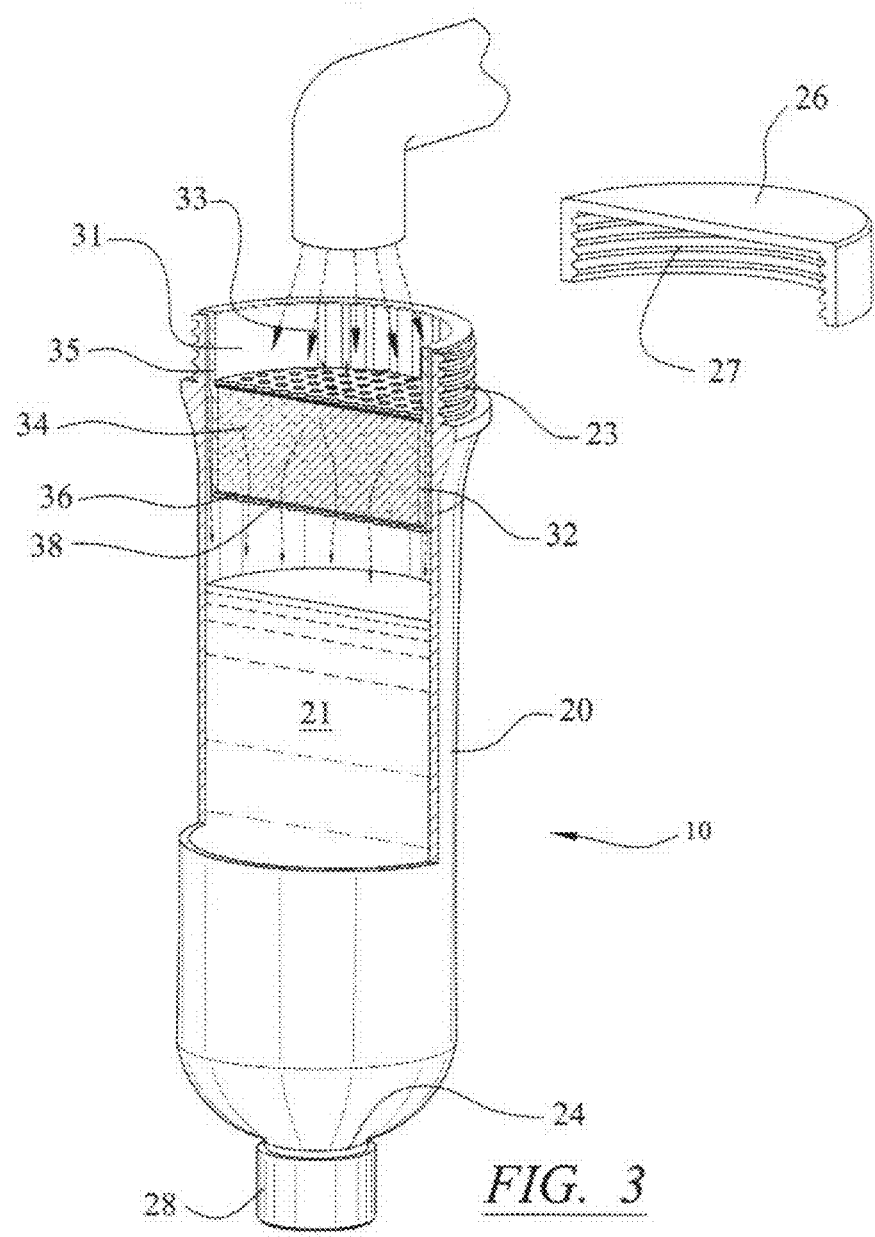
FIG. 3 is a cross sectional view of the first embodiment of the water bottle with the sealable bottom cap removed and with water being poured into the filling chamber.

Referring to FIG. 3, the manner of filling the bottle 20 is shown. Specifically, a flow of municipal water from a faucet is directed into the bottom opening 22 of the bottle 20 and fills within the filling chamber 31. A portion of this water immediately passes through the filter assembly in the upper compartment 32 of filter cartridge 30 for filtration. The remaining water bypasses the filter assembly and passes through the slots 33 along the side wall 35 of the filling chamber 31 to prevent a backup of water and overflow of the filling chamber 31. The water that passes through the slots goes directly into the interior 21 of bottle 20. Once the filtered portion of the water passes through the upper chamber 32 and the filtration assembly of the membrane filters 36 and carbon media 34, it also enters and fills into the interior 21 of bottle 20. After the desired level of water has been filled within the interior of the bottle, the bottom cap 26 is attached and sealed by aligning the interior threads 27 of cap 26 with the exterior threads 23 of bottom opening 22 and twisting the cap 26 until hand tight.

Figure 4:
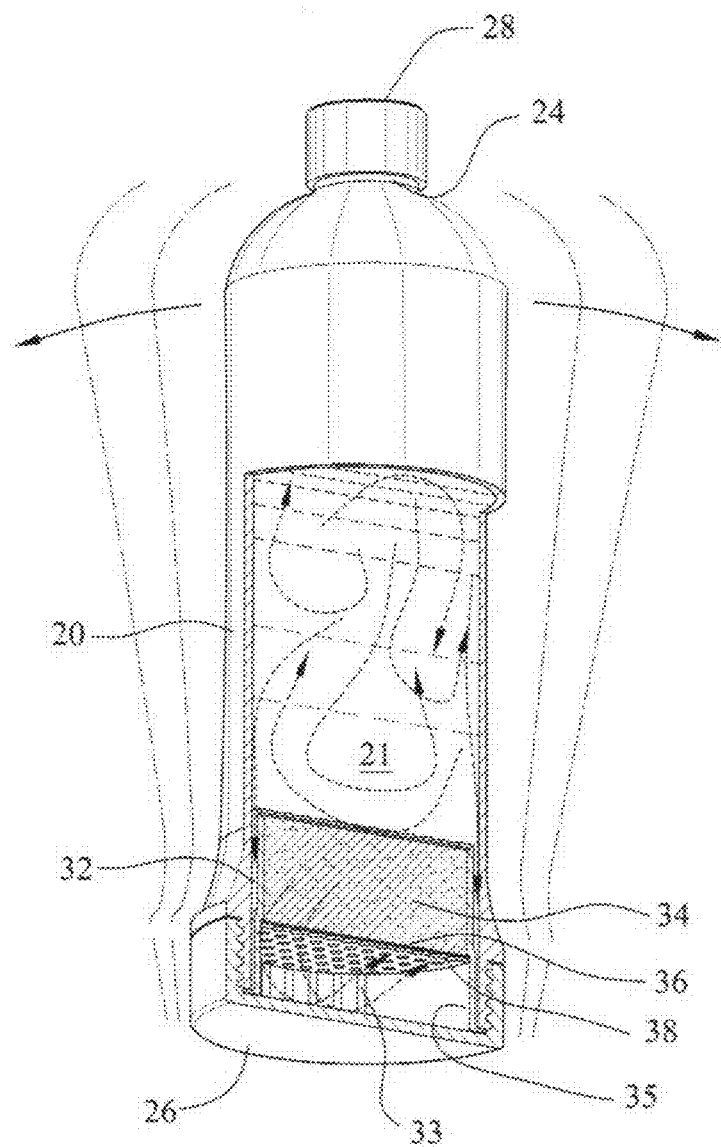
FIG. 4 is a cross sectional view of the first embodiment of the water bottle while it is sealed and filled with water, illustrating how the water enters back into the filling chamber and through the filtration media and membranes.
Figure 5:
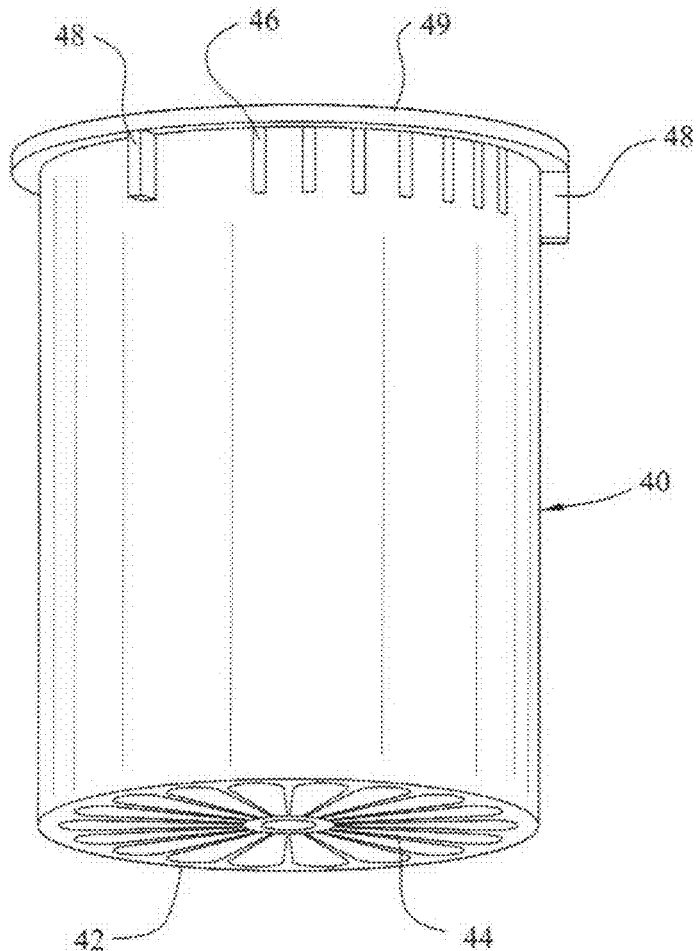
FIG. 5 is a perspective view of a filter cartridge housing according to a second and a third preferred embodiment of the present invention.
Figure 6:
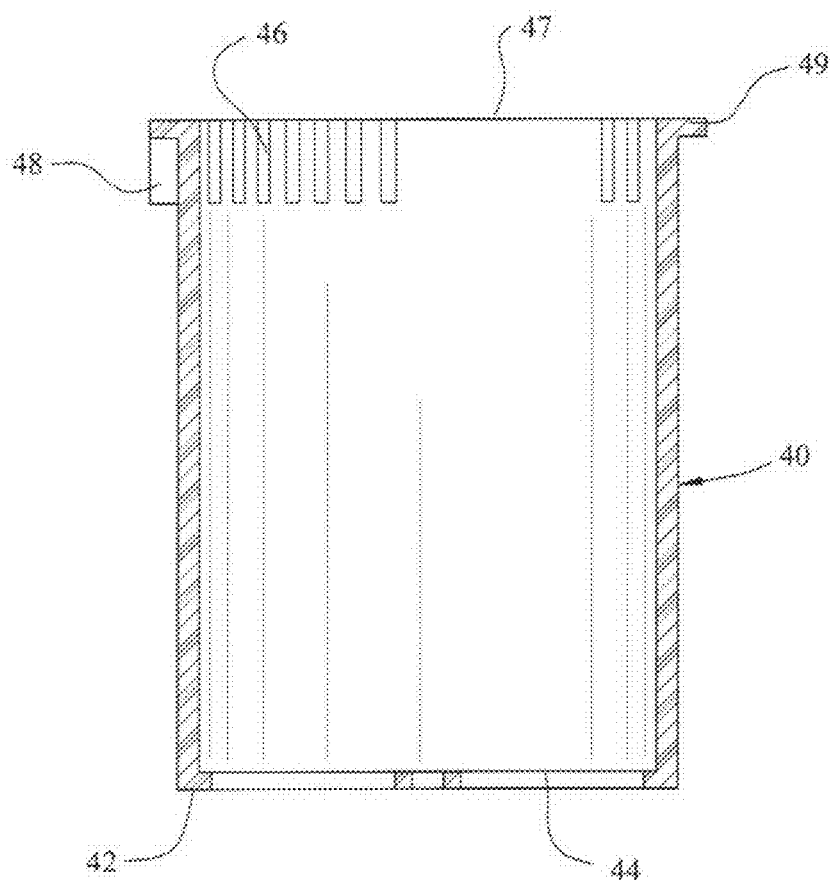
FIG. 6 is an elevational cross-sectional view of the filter cartridge housing of FIG. 5.
Figure 7:
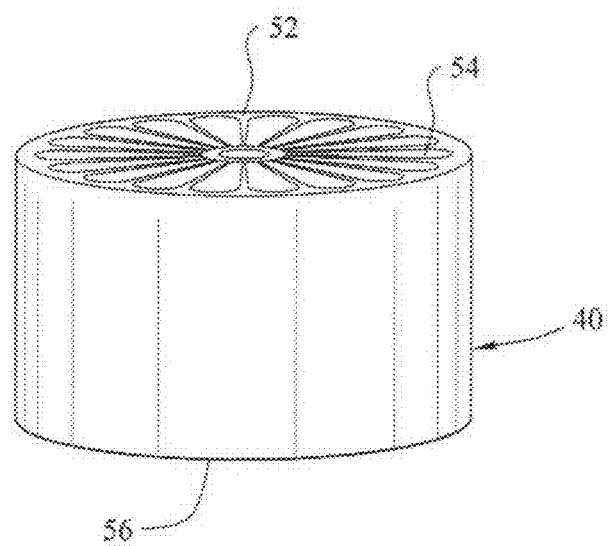
FIG. 7 is a perspective view of the filter component according to the second preferred embodiment of the present invention.
Figure 8:
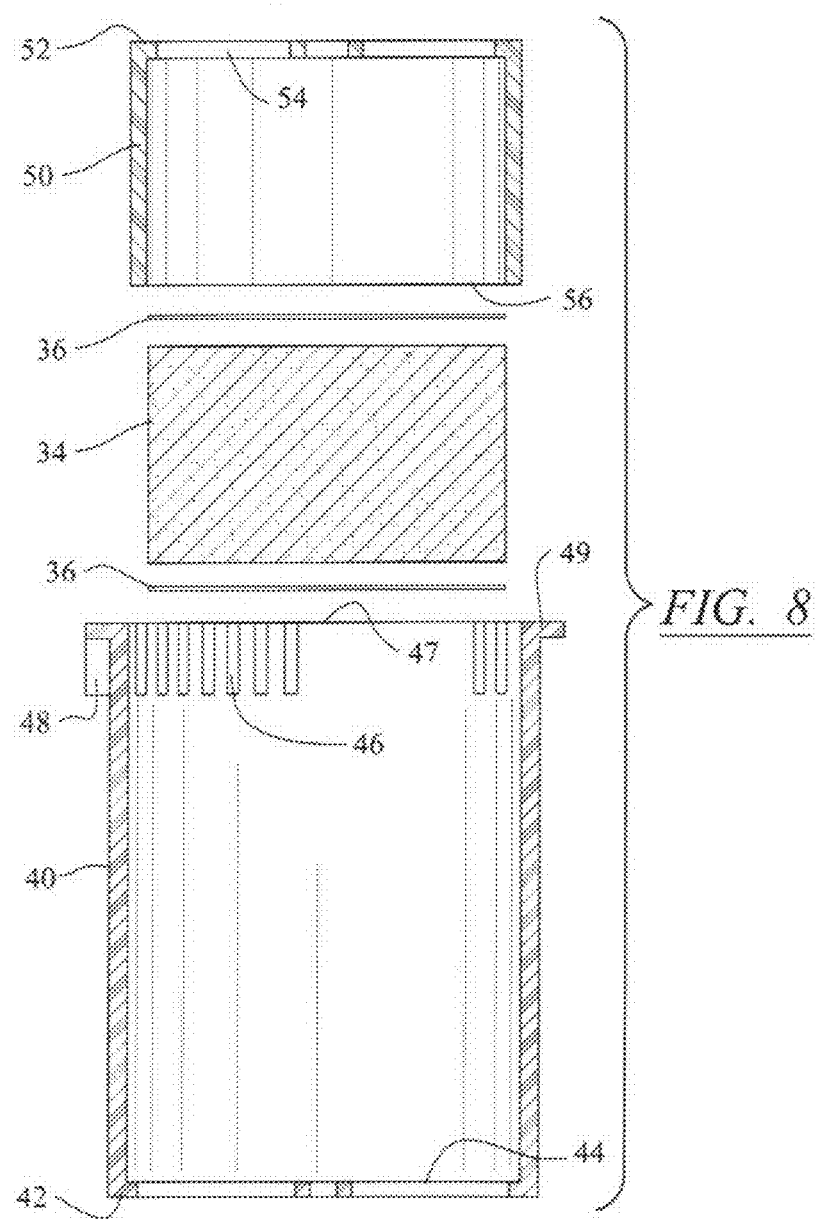
FIG. 8 is an exploded cross-sectional view of the second embodiment of the combined filtration cartridge and filter component.
Figure 9:
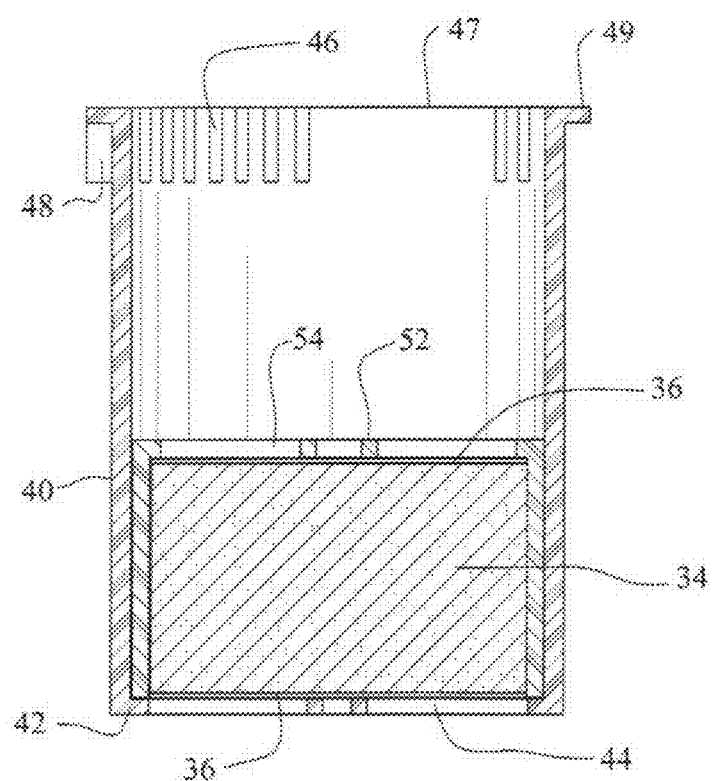
FIG. 9 is a cross-sectional view of the second embodiment of the combined filtration cartridge and filter component.
Figure 10:
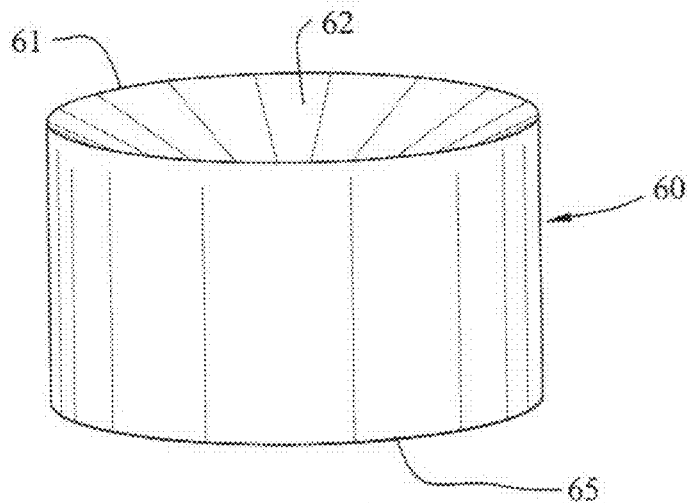
FIG. 10 is a perspective view of the filter component according to a third embodiment of the present invention.
Figure 11:
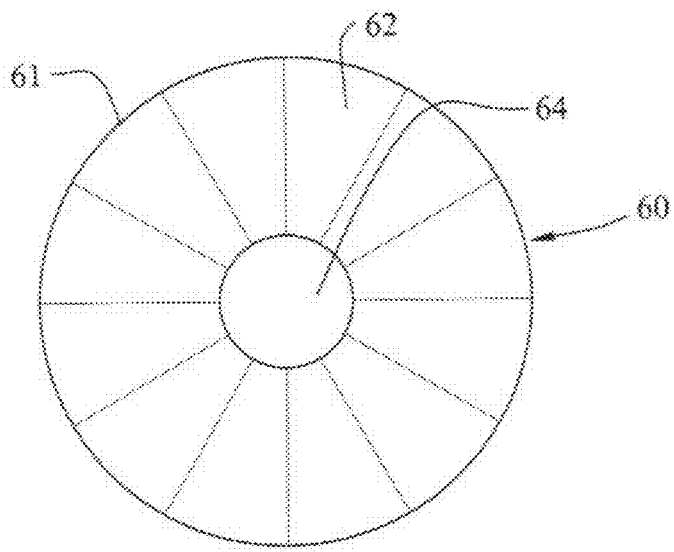
FIG. 11 is a top plan view of the filter component of the third embodiment of the present invention.
Figure 12:
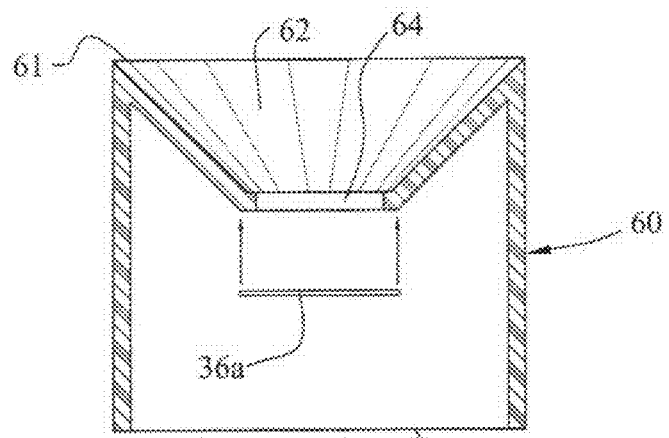
FIG. 12 is a cross sectional view of the filter component of the third embodiment of the present invention illustrating how the membrane filter attaches to the opening of the funnel.

Referring to FIG. 4, once the bottle 20 has been filled with water and sealed, the remainder of the unfiltered water will eventually pass back through the slots 33 and into the filling chamber 31. Some of this water will then pass through the upper compartment 32 and filtration assembly of the filter cartridge 30. Due to the motion of the water, almost all if not all of the initially unfiltered water will eventually pass through the upper filtration compartment 32 of filter cartridge 30 and will therefore be filtered.

Referring to FIGS. 5-9, a second embodiment of the filter cartridge 40 is shown. A bottom end 42 is shown to have a flower petal design of openings 44 to allow water to pass from the filtration cartridge 40 into the interior 21 of bottle 20. A filter component 50 (see FIG. 7) has a top end 52 with a similar flower petal design of openings 54 and a bottom open end 56. The carbon based media 34 and two sheets of membrane filters 36 are placed within this component 50. The filter component 50 is inserted into the filtration cartridge 40 leaving an upper portion of the interior of the filtration cartridge 40 empty to act as a filling chamber for unfiltered water. This embodiment of the filtration cartridge 40 uses an arrangement of rectangular slots 46, stabilizing fins 48 and an annular flange 49 at a top open end 47, similar to the previously disclosed embodiment of FIGS. 1-4.

Figure 13:
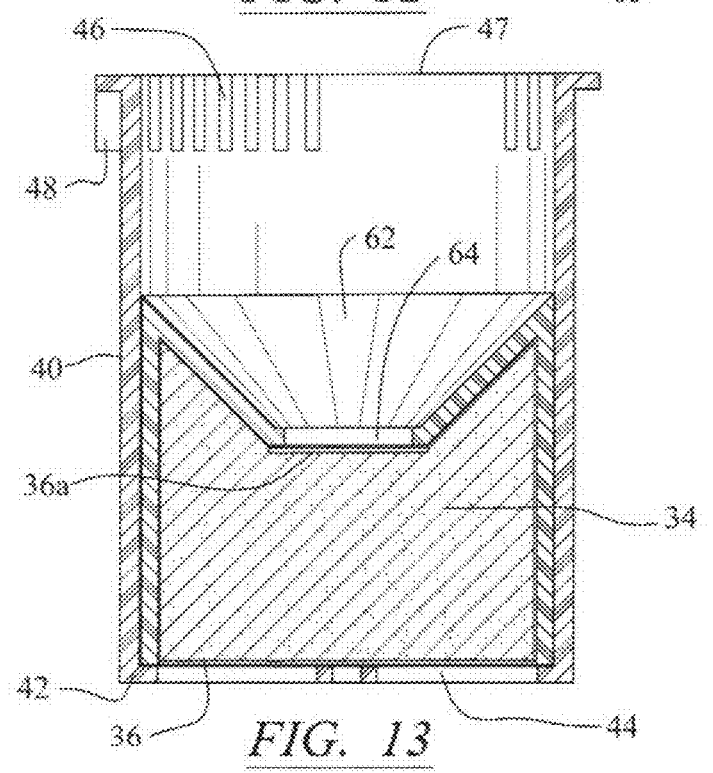
FIG. 13 is a cross-sectional view of the third embodiment of the combined filter cartridge and filter component.

Referring to FIGS. 10-13, a third embodiment of the filtration cartridge 40 is shown. The housing or shell of the filtration cartridge 40 is unchanged from the second embodiment shown in FIG. 5-9, however an alternative filter component 60 has a top end 61 with a funnel shaped top 62 and single opening 64 at the base of the funnel instead of the flower petal design of openings 54 used by the filter component 50 of the second embodiment. The filter component 60 also comprises a bottom open end 65. A smaller diameter membrane filter 36a is fitted below the opening 64, as seen in FIG. 13. The carbon based media 24 is filled within the interior of component 60 and a second membrane filter 36 covers the bottom open end 65. The funnel shaped top 62 and single opening 64 promote faster flow of water through the filtration assembly of the membrane filter 36a, the carbon based media 34 and the second membrane filter 36 for filtering the water prior to entering the interior of the bottle 20.

In order to consume the filtered water, the top cap 28 is removed to allow unobstructed flow of the water out through the top open end 24 of the water bottle 20. Alternatively, in a sports bottle design, a valve and nipple device is provided on the top end. The nipple device is simply pulled upwardly to open the valve, thereby allowing the filtered water to exit a top opening in the nipple device. By squeezing the bottle, a stream of water can be directed out from the open end of the nipple device without requiring the user to make contact between the mouth and the top valve device of the bottle. The filter cartridge has a useful life of approximately 40-60 gallons or two months use. Thereafter, a new filter can be replaced in the bottom of the water bottle for subsequent use. Alternatively, the bottle can be disposed of in a recycling bin or other appropriate container for recycling along with other plastic containers.

While the present invention has been shown and described in accordance with several preferred and practical embodiments thereof, it is recognized that departures from the instant disclosure are fully contemplated within the spirit and scope of the invention which is not to be limited except as defined in the following claims and under the doctrine of equivalents.

What is claimed is:

1. A portable water bottle comprising:
a bottle body with a wall structure extending from a bottom end to a top neck surrounding an open top, and said bottom end including an annular rim surrounding an open bottom, said open bottom and said open top communicating with an interior chamber that is surrounded by the wall structure, and said bottom end having exterior screw threads above said annular rim;
a filter cartridge sized, structured and disposed for removable passage through said open bottom and into a lower portion of said interior chamber of said bottle body for filtering a flow of water being filled into said interior chamber, and said filter cartridge comprising:
an outer shell defined by a ridged wall extending from a first open end to a second end and said outer shell including an annular flange at said first open end for seated engagement with said annular rim of said bottle body when said filter cartridge is fully inserted through said open bottom of said bottle body to define an operable position of said filter cartridge relative to said bottle body, and said annular flange stopping said filter cartridge from moving further into said interior chamber of said bottle body beyond said operable position;
a filter assembly within said outer shell and including a first filter membrane, a second filter membrane proximate to said second end of said outer shell, and a carbon based media sandwiched between said first filter membrane and said second filter membrane;
a bottom cap including interior screw threads, and said bottom cap being structured and disposed for removable attachment to said bottom end of said bottle body by threaded engagement of said exterior screw threads of said bottle body with said interior screw threads of said bottom cap, and said bottom cap being further structured and disposed for holding said filter cartridge in said operable position and sealing said open bottom of said bottle body water tight when said bottom cap is attached to said bottom end of said bottle body; and
a top cap for removable attachment to said top neck for covering said open top and sealing said open top watertight.

2. The portable water bottle as recited in claim 1 wherein said filter cartridge further comprises:
a first filter cover over said first filter membrane;
a second filter cover over said second filter membrane; and
said first and second filter covers having an arrangements of openings formed therethrough for promoting fluid flow through said filter assembly.

3. The portable water bottle as recited in claim 2 wherein said first and second filter covers comprise rigid disk members bonded to said outer shell.

4. The portable water bottle as recited in claim 3 wherein said filter cartridge further comprises:
an upper portion proximate to said first open end of said outer shell and defining a filling chamber;
a second portion proximate to said second end of said outer shell and including said filter assembly;
said first portion and said second portion of said filter cartridge surrounded by said rigid wall of said outer shell; and
an arrangement of slotted openings formed through said rigid wall surrounding said first portion of said filter cartridge, and said arrangement of said slotted openings communicating with said interior chamber of said bottle body for allowing fluid flow of water between said filling chamber of said first portion of said filter cartridge and said interior chamber of said bottle body, thereby discouraging overflow of said filling chamber when filling said interior chamber of said bottle body with water and further promoting continued filtration of water in said interior chamber after filling said interior chamber and attaching said bottom cap.

5. The portable water bottle as recited in claim 4 wherein said first filter membrane and said second filter membrane have a pore size ranging between 0.7 and 50 microns.

6. The portable water bottle as recited in claim 5 wherein said carbon based media is silver impregnated activated carbon.

7. The portable water bottle as recited in claim 5 wherein said carbon based media is coconut activated carbon.

8. The portable water bottle as recited in claim 5 wherein said carbon based media is coal activated carbon.

9. The portable water bottle as recited in claim 5 wherein said carbon based media is lignite activated carbon.

10. The portable water bottle as recited in claim 5 wherein said carbon based media is wood activated carbon.

11. The portable water bottle as recited in claim 1 wherein said first filter membrane and said second filter membrane have a pore size ranging between 0.7 and 50 microns.

12. The portable water bottle as recited in claim 11 wherein said carbon based media is silver impregnated activated carbon.

13. The portable water bottle as recited in claim 11 wherein said carbon based media is coconut activated carbon.

14. The portable water bottle as recited in claim 11 wherein said carbon based media is coal activated carbon.

15. The portable water bottle as recited in claim 11 wherein said carbon based media is lignite activated carbon.

16. The portable water bottle as recited in claim 11 wherein said carbon based media is wood activated carbon.

* * * * *